June 29, 1948.  O. S. JONES  2,444,294

DENTAL PLATE CONTAINER

Filed March 4, 1947

Inventor

Oscar S. Jones

By *Clarence A. O'Brien and Harvey B. Jacobson*
Attorneys

Patented June 29, 1948

2,444,294

UNITED STATES PATENT OFFICE 2,444,294

DENTAL PLATE CONTAINER

Oscar S. Jones, Chicago, Ill., assignor of one-third to Robert F. Edwards, Chicago, Ill.

Application March 4, 1947, Serial No. 732,344

1 Claim. (Cl. 206—1)

The present invention relates to new and useful improvements in dental plate containers whereby dental plates may be safely and conveniently stored or carried when not being worn and without danger of becoming lost or misplaced and whereby the plate may be carried without danger of damaging the parts thereof.

An important object of the present invention is to provide a container of this character and embodying an adjustable form on which plates of various sizes may be positioned and securely held against injury while being carried in the case.

A further object of the invention is to provide a container of this character of simple and practical construction, which is neat and attractive in appearance and relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
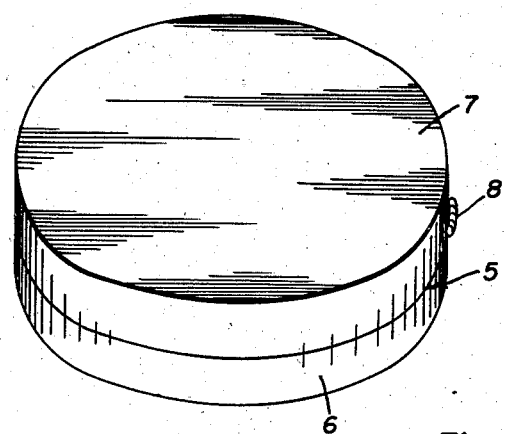
Figure 1 is a perspective view showing the container in a closed position.

Referring now to the drawing in detail wherein for the purpose of illustration I have disclosed a preferred embodiment of the invention the numeral 5 designates a pocket case or container generally and which includes a bottom 6 and top 7 of oval construction, the top 7 being hingedly connected to the bottom 6 at one end by a conventional hinge structure 8.

Positioned in the bottom 6 is a pair of U-shaped dental plate holders 9 and 10, the ends of the holders being positioned in opposed relation with respect to each other. Each of the dental plate holders is of identical construction and accordingly a detail explanation of one will suffice for both.

Figure 2:
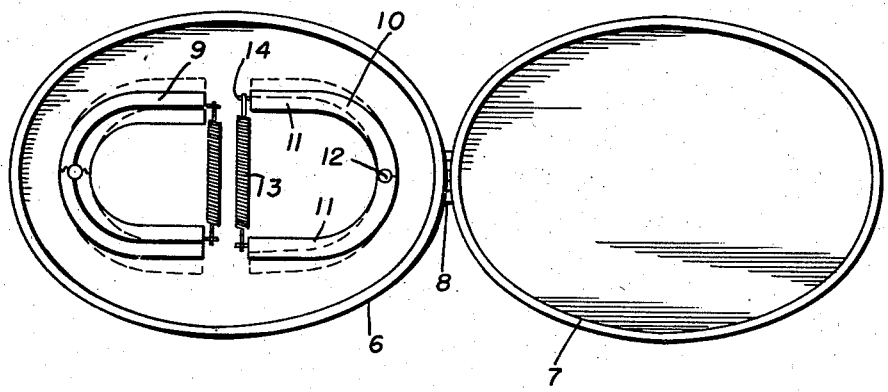
Figure 2 is a top plan view showing the container in an open position.
Figure 3:
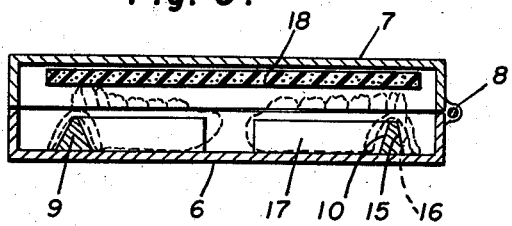
Figure 3 is a transverse sectional view thereof.

The sides 11 of the holder are pivotally connected to each other at their inner ends by a pin 12 secured to the bottom 6 to provide for a swinging movement of the ends 11 toward and away from each other. A coil spring 13 is attached at its ends to the ends 11 of the dental plate holder by means of pins or the like 14, the spring exerting its influence on the ends 11 of the dental plate holder to move the latter toward each other into a contracted position as shown by the full lines in Figure 2 of the drawing.

The dental plate holder is constructed in the form of a U-shaped rib with its side edges tapering upwardly as shown at 15 and adapted to enter the groove 16 at the back of a dental plate 17, the dental plate thus being mounted on the holder in the same manner when mounted on the gums of a person while being worn.

By reason of the contracting action of the sides 11 of the dental plate holder by the spring 13 the holder will tightly grip the walls of the groove 16 to thus securely hold the dental plate in position in the case.

To the underside of the lid 7 is secured an absorbent pad 18 which may be saturated with a germicidal fluid as a sanitary protecting means for the teeth when carried in the case.

From the foregoing it will be apparent that by reason of the adjustable nature of the dental plate holders 9 and 10 that dental plates of various sizes may be mounted and secured in position thereon.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A dental plate holder comprising a case, a U-shaped rib having sides pivoted in the case for swinging movement toward and away from each other to expand and contract in accordance with variations in the size of a plate mounted on the rib, and resilient means connecting the ends of the rib to each other to contract the same.

OSCAR S. JONES.

REFERENCES CITED

The following references are of record in the file of this patent:

UNITED STATES PATENTS

| Number | Name | Date |
|---|---|---|
| 2,122,583 | Parizot | July 5, 1938 |

FOREIGN PATENTS

| Number | Country | Date |
|---|---|---|
| 207,826 | Germany | Mar. 11, 1909 |